Aug. 16, 1932.  A. B. WERDEHOFF  1,872,539
HOOD LACING
Filed Dec. 6, 1929
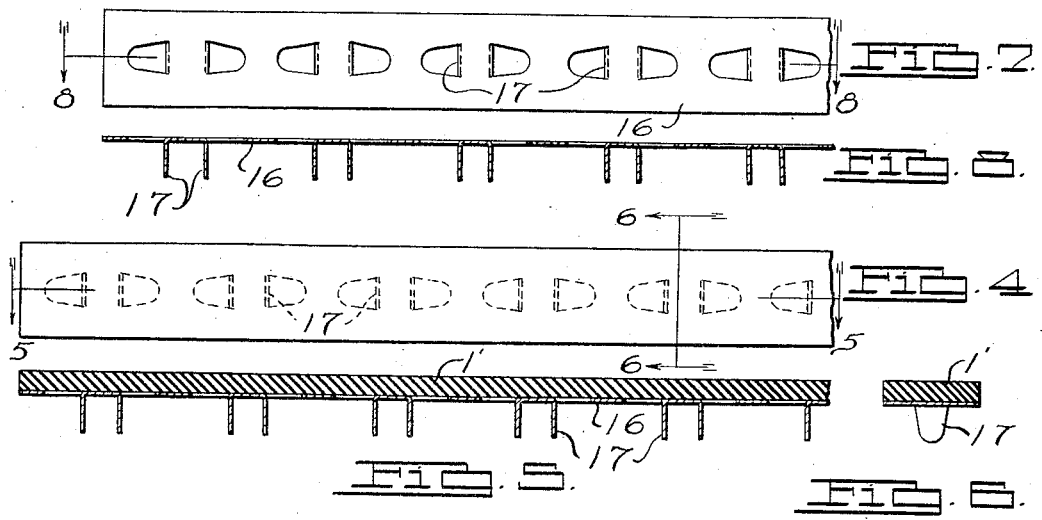
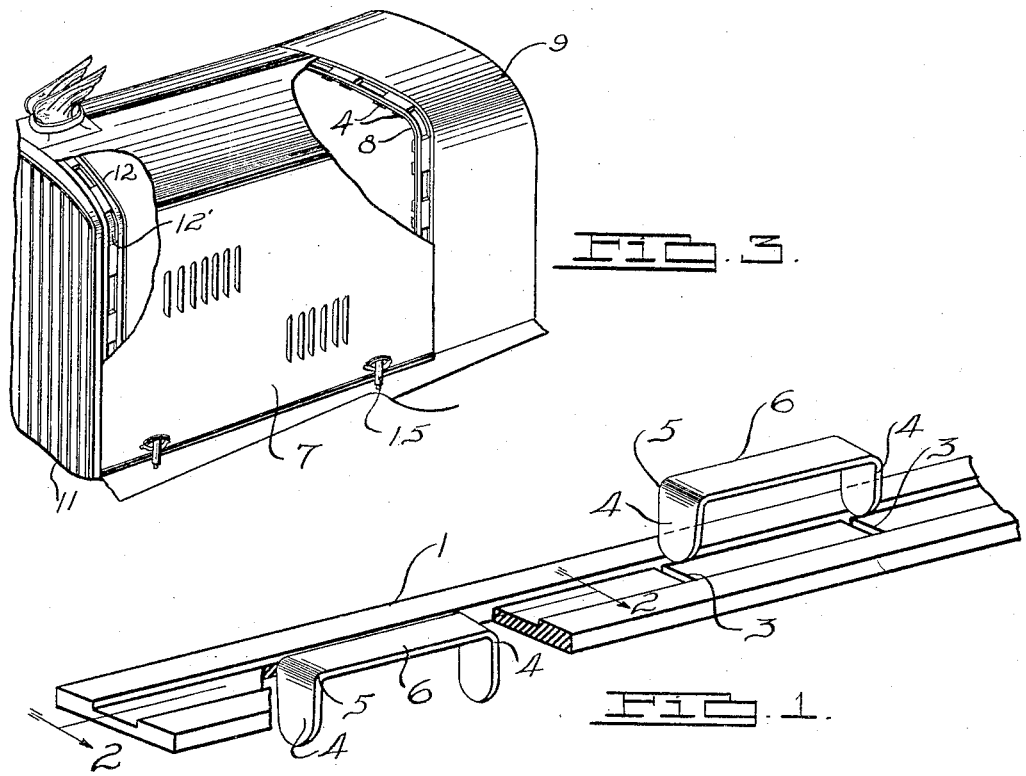
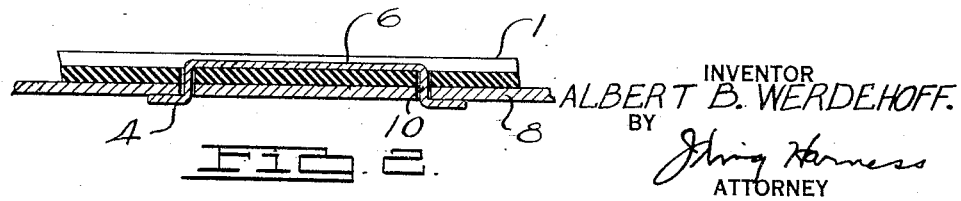
INVENTOR
ALBERT B. WERDEHOFF.
BY
ATTORNEY Patented Aug. 16, 1932

1,872,539

UNITED STATES PATENT OFFICE

ALBERT B. WERDEHOFF, OF ORION, MICHIGAN, ASSIGNOR TO CHRYSLER CORPORATION, OF DETROIT, MICHIGAN, A CORPORATION OF DELAWARE

HOOD LACING

Application filed December 6, 1929. Serial No. 412,244.

The main objects of this invention are to provide a compressible hood lacing for vehicle bodies; to provide a lacing of this kind which will seal the joints between the hood and the cowl and radiator of a vehicle against the admission of rain, sleet and snow; to provide a hood lacing comprising resiliently yieldable material which will coact with the hood clamps of a vehicle in tensionally securing the hood thereof against vibration and rattling; to provide lacing of this kind comprising rubber; to provide improved means for detachably securing a rubber hood lacing to a cowl and radiator of a vehicle so as to permit convenient attachment and replacement of the lacing when it becomes worn; to provide an elastic hood lacing which will readily conform to the curvatures of the cowl and radiator of a vehicle so as to prevent buckling of the lacing; and to provide an improved construction in rubber hood lacings for avoiding metal to metal contact between the hood and the cowl and radiator of a vehicle when metallic means are employed for securing the lacings in place.

An illustrative embodiment of my invention is shown in the accompanying drawing, in which:

Fig. 1 is a perspective view partly in section.

Fig. 2 is a horizontal section taken on line 2—2 of Fig. 1.

Fig. 3 is a fragmentary perspective showing a vehicle radiator, cowl and hood embodying my invention.

Fig. 4 is a plan view of a modified form of my invention.

Fig. 5 is a longitudinal vertical section taken on line 5—5 of Fig. 4.

Fig. 6 is a vertical transverse section taken on line 6—6 of Fig. 4.

Fig. 7 is a detail plan view showing an attaching strip of the type illustrated in Fig. 4.

Fig. 8 is a vertical section taken on line 8—8 of Fig. 7.

In the form shown, the improved hood lacing comprises a rubber strip 1 having a longitudinal groove 2 in one surface thereof and a plurality of pairs of spaced apertures 3 which communicate with the groove 2. Extending through an aperture 3 of each pair is a lug 4 of a substantially channel shaped clip 5 which has a portion 6 seated in the groove 2. The top surface of the portion 6 is located below the top surface of the rubber strip 1 so as to prevent metal to metal contact between the clip and the hood 7 of a vehicle. The lower side of the portion 6 may be vulcanized or otherwise secured to the rubber strip 1.

As shown in Fig. 3, the hood lacing is mounted on a flange 8 of the cowl 9 and the lugs 4 of the clips are inserted through apertures 10 in the flange 8 which register with the apertures 3 of the strip 1. The strip is secured against displacement from the cowl 9 by bending the end portions of the lugs 4 over adjacent the inner side of the flange 8.

The radiator 11 of the vehicle shown in Fig. 3, is provided with a flange 12 on which a hood lacing comprising a rubber member 12′ is also mounted in the manner described above. The respectively opposite end portions of the hood 7 rest upon the rubber strips 1 and 12′ on the flanges 8 and 12 respectively, so as to form a substantially water tight seal between the cowl and the hood at one end and between the radiator and the hood at the other end.

The elasticity of the rubber strip 1 permits a standard lacing to readily conform to the shape of hoods and radiators of various forms. When the sides of the hood are urged downwardly by the hood clamps 15, the resiliency of the rubber strips 1 holds the hood 7 under tension so as to obviate vibration and rattling thereof.

In the modified form of my invention shown in Figs. 4 to 8 inclusive, a rubber strip 1′ has rigidly secured to the bottom thereof, an integral plate 16 from which downwardly extending lugs 17 are struck. These lugs may be inserted through properly spaced apertures in the flanges 8 and 12 shown in Fig. 3 and bent over substantially as shown in Fig. 2. In this form of my invention, the rubber strip 1 may be cemented, vulcanized or secured in any desirable way to the plate 16 so as to avoid the exposure of metal at the upper surface of the yieldable member.

Although but two specific embodiments of this invention have herein been shown and described, it will be understood that various details including the size, shape and arrangement of parts may be made without departing from the spirit of my invention and it is not my intention to limit its scope other than by the terms of the appended claims.

I claim:

1. In a vehicle structure including a hood receiving seat having spaced apertures therein, a hood lacing on said seat comprising a rubber strip having a groove in its outer side and having spaced apertures therethrough registering with the apertures in said hood seat and opening into said groove, and a detachable metal clip including an intermediate plate seated in said groove and having its end portions bent downwardly with respect to said plate providing rounded extremities therefor and providing spaced lugs, said lugs extending through the apertures of said hood lacing and seat and bent over adjacent the inner side of said seat for firmly compressing the portion of said hood lacing underlying said plate upon said seat.

2. A hood lacing comprising a rubber strip having a longitudinal groove and a pair of spaced apertures therethrough opening into said groove, a detachable channel shaped clip having an intermediate plate seated in said groove and having a pair of spaced lugs, one on each extremity of said plate and each extending through one of said apertures and each adapted to be bent adjacent one side of a support for compressing said rubber strip between the opposite side of the support and the entire length of said plate.

ALBERT B. WERDEHOFF.